(12) United States Patent
Leiber

(10) Patent No.: US 12,005,870 B2
(45) Date of Patent: Jun. 11, 2024

(54) BRAKE SYSTEM, IN PARTICULAR FOR AUTOMATIC DRIVING

(71) Applicant: IPGATE AG, Pfäffikon (CH)

(72) Inventor: Heinz Leiber, Oberriexingen (DE)

(73) Assignee: IPGATE AG, Pfäffikon (CH)

( * ) Notice: Subject to any disclaimer, the term of this patent is extended or adjusted under 35 U.S.C. 154(b) by 747 days.

(21) Appl. No.: 17/053,656

(22) PCT Filed: May 9, 2019

(86) PCT No.: PCT/EP2019/061924
§ 371 (c)(1),
(2) Date: Nov. 6, 2020

(87) PCT Pub. No.: WO2019/215283
PCT Pub. Date: Nov. 14, 2019

(65) Prior Publication Data
US 2021/0122349 A1 Apr. 29, 2021

(30) Foreign Application Priority Data
May 9, 2018 (DE) ..................... 10 2018 111 126.6

(51) Int. Cl.
*B60T 13/66* (2006.01)
*B60T 7/04* (2006.01)
(Continued)

(52) U.S. Cl.
CPC ............ *B60T 13/662* (2013.01); *B60T 7/042* (2013.01); *B60T 13/686* (2013.01); *B60T 13/741* (2013.01);
(Continued)

(58) Field of Classification Search
None
See application file for complete search history.

(56) References Cited

U.S. PATENT DOCUMENTS

| | | | |
|---|---|---|---|
| 4,658,939 A | 4/1987 | Kircher et al. | |
| 4,793,447 A | * 12/1988 | Taig | F16D 55/224 475/342 |

(Continued)

FOREIGN PATENT DOCUMENTS

| | | |
|---|---|---|
| CN | 1931646 A | 3/2007 |
| CN | 101362460 A | 2/2009 |

(Continued)

OTHER PUBLICATIONS

Search Report dated May 6, 2019 in DE Application No. 10 2018 111 126.6.

(Continued)

*Primary Examiner* — Adam D Tissot
*Assistant Examiner* — Garrett F Evans
(74) *Attorney, Agent, or Firm* — Panitch Schwarze Belisario & Nadel LLP

(57) ABSTRACT

A brake system for a motor vehicle may include at least one pressure supply device, formed by a hydraulic piston-cylinder unit driven by an electric motor, for hydraulic adjustment of a brake piston of at least one wheel brake, and at least one electromechanically actuatable wheel brake for electrical adjustment of a brake piston of a wheel brake. An electric motor and a first gearbox, which transmits the driving force of the electric motor to a further gearbox, are provided for electromechanical actuation of the wheel brake. The electromechanically actuatable wheel brake has a hydraulic control device having a piston-cylinder unit, the control piston of which serves for adjusting the brake piston and/or exerting a force on the brake piston. The control piston can be adjusted or a force can be exerted on the control piston.

24 Claims, 10 Drawing Sheets

Figure 1:
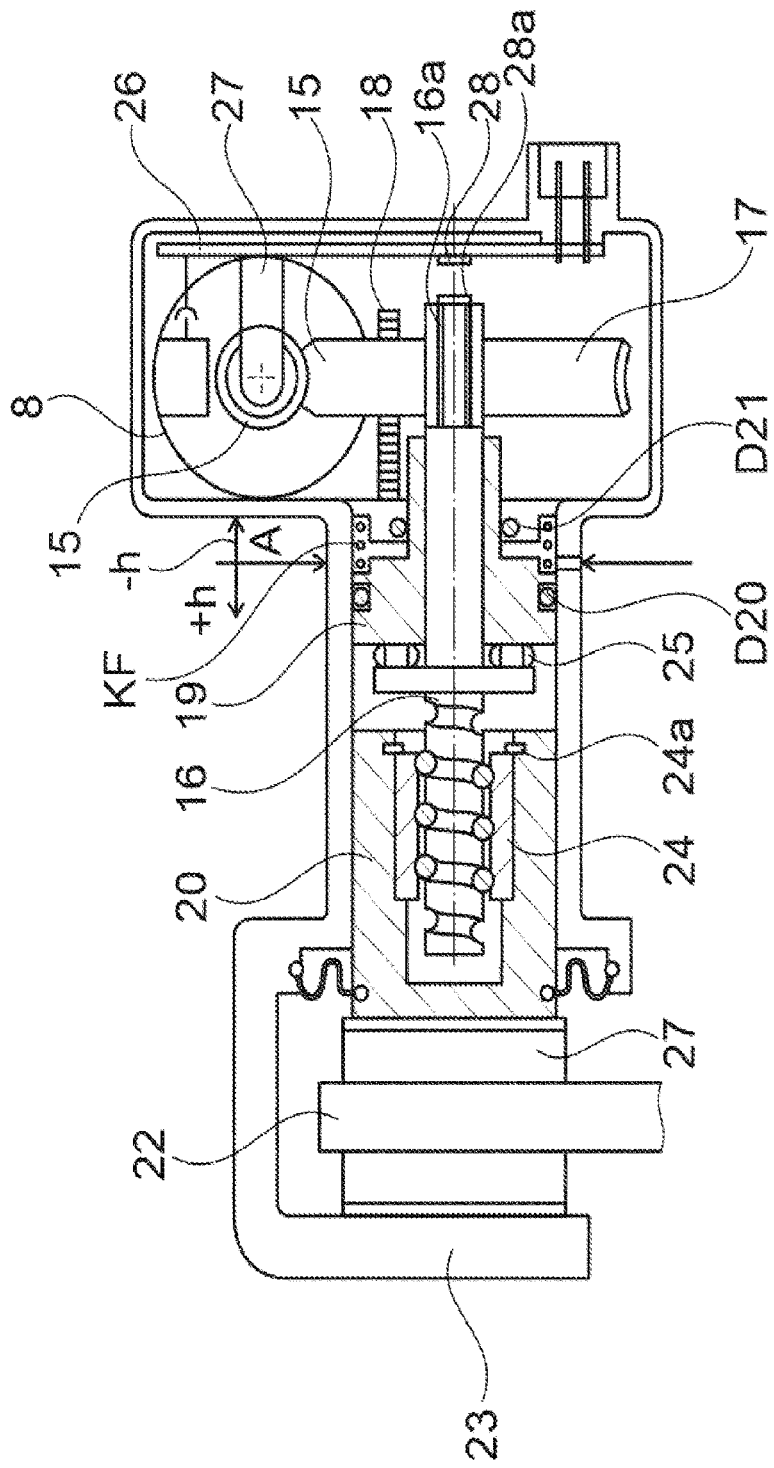

(51) Int. Cl.
*B60T 13/68* (2006.01)
*B60T 13/74* (2006.01)

(52) U.S. Cl.
CPC ....... *B60T 13/745* (2013.01); *B60T 2270/402* (2013.01); *B60Y 2400/81* (2013.01)

(56) References Cited

U.S. PATENT DOCUMENTS

| | | | |
|---|---|---|---|
| 6,481,543 B1 * | 11/2002 | Shaw | F16D 65/567 |
| | | | 188/71.9 |
| 7,559,413 B2 * | 7/2009 | Haffelder | B60T 13/588 |
| | | | 188/72.4 |
| 8,540,324 B2 | 9/2013 | Leiber et al. | |
| 10,358,119 B2 | 7/2019 | Besier et al. | |
| 2006/0163939 A1 | 7/2006 | Kuramochi et al. | |
| 2006/0267402 A1 * | 11/2006 | Leiter | B60T 13/741 |
| | | | 303/20 |
| 2009/0057073 A1 * | 3/2009 | Ishii | B60T 5/00 |
| | | | 188/71.6 |
| 2009/0091180 A1 | 4/2009 | Iwasaki et al. | |
| 2010/0051395 A1 | 3/2010 | Sano et al. | |
| 2010/0241330 A1 | 9/2010 | Hartmann et al. | |
| 2011/0042171 A1 * | 2/2011 | Knechtges | B60T 13/745 |
| | | | 188/106 F |
| 2011/0162935 A1 | 7/2011 | Winkler et al. | |
| 2013/0232966 A1 | 9/2013 | Murayama et al. | |
| 2013/0333376 A1 | 12/2013 | Murayama et al. | |
| 2016/0009263 A1 | 1/2016 | Feigel et al. | |
| 2016/0278245 A1 | 9/2016 | Koga et al. | |
| 2016/0355169 A1 | 12/2016 | Ohlig et al. | |
| 2017/0072920 A1 | 3/2017 | Besier et al. | |
| 2018/0072285 A1 | 3/2018 | Tanaka et al. | |
| 2018/0194337 A1 | 7/2018 | Leiber et al. | |
| 2019/0031165 A1 | 1/2019 | Besier et al. | |
| 2020/0079335 A1 | 3/2020 | Linhoff et al. | |
| 2020/0114894 A1 | 4/2020 | Leiber | |
| 2020/0223408 A1 | 7/2020 | Goto et al. | |
| 2021/0122349 A1 | 4/2021 | Leiber | |
| 2022/0105914 A1 | 4/2022 | Leiber et al. | |
| 2022/0126806 A1 | 4/2022 | Leiber | |
| 2023/0056306 A1 | 2/2023 | Tarandek et al. | |

FOREIGN PATENT DOCUMENTS

| | | |
|---|---|---|
| CN | 105835857 A | 8/2016 |
| DE | 3410006 A1 | 9/1985 |
| DE | 19817892 A1 | 10/1999 |
| DE | 10010735 A1 | 1/2001 |
| DE | 10319194 B3 | 9/2004 |
| DE | 102005055751 A1 | 11/2006 |
| DE | 102010050132 A1 | 5/2012 |
| DE | 102011110892 A1 | 2/2013 |
| DE | 102012216590 A1 | 3/2014 |
| DE | 102013018073 A1 | 5/2015 |
| DE | 202015008975 U1 | 6/2016 |
| DE | 102015213866 B3 | 12/2016 |
| DE | 102016112971 A1 | 1/2018 |
| EP | 2878501 A1 | 6/2015 |
| JP | H11-287269 A | 10/1999 |
| WO | 2008092683 A1 | 8/2008 |
| WO | 2015036623 A2 | 3/2015 |
| WO | 2015177207 A1 | 11/2015 |
| WO | 2016023994 A1 | 2/2016 |
| WO | 2016029994 A1 | 3/2016 |
| WO | 2016146223 A2 | 9/2016 |
| WO | 2016146224 A1 | 9/2016 |
| WO | 2016146692 A1 | 9/2016 |

OTHER PUBLICATIONS

Int'l Search Report and Written Opinion dated Oct. 29, 2019 Int'l Application No. PCT/EP2019/061909, English translation of Int'l Search Report only.
Int'l Search Report and Written Opinion dated Aug. 14, 2019 in Int'l Application No. PCT/EP2019/061924, English translation of Int'l Search Report only.
Office Action dated Jan. 25, 2022 in Chinese Application No. 201980031319.1.
Office Action dated Nov. 24, 2023 in U.S. Appl. No. 17/053,009.

* cited by examiner

BRAKE SYSTEM, IN PARTICULAR FOR AUTOMATIC DRIVING

CROSS-REFERENCE TO RELATED APPLICATION

This application is a Section 371 of International Application No. PCT/EP2019/061924, filed May 9, 2019, which was published in the German language on Nov. 14, 2019 under International Publication No. WO 2019/215283 A1, which claims priority under 35 U.S.C. § 119(b) to German Patent Application No. 10 2018 111 126.6, filed May 9, 2018, the disclosures of which are incorporated herein by reference.

The invention relates to a brake system according to the preamble of patent claim 1.

PRIOR ART

Future brake systems must satisfy various increased or additional requirements. These are in particular extreme fail safety ("fail operational" FO) for automated driving (AD), a reliable immobilizing brake in electrically driven vehicles (electric vehicles), in the case of which the conventional redundant mechanical parking lock in the transmission is omitted.

So-called combination brakes (EHC) are known in which a hydraulically actuated braking device is provided at the front axle (VA) and an electrically actuated braking device is provided at the rear axle (HA). Such a combination brake is presented for example in DE 103 19 194 B3. In the case of EHC solutions, self-locking and non-self-locking reduction gear mechanisms have been proposed for the electrically actuated braking device. A parking lock is necessary in the case of non-self-locking reduction gear mechanisms. However, in the event of failure of the lock, no immobilizing brake action is available.

Furthermore, during driving operation, in addition to the known control functions such as ABS/ESP and recuperation, brake systems must also meet functional requirements for Automatic Emergency Braking (AEB). The actuators/pressure supplies must be configured in terms of their performance such that a "time to lock" until the locking pressure, for example 100 bar, is reached (TTL) amounts to 150 ms.

Self-locking reduction gear mechanisms are used predominantly in electric immobilizing brakes or electric parking locks (EPB), as known for example from DE 10 2015 213866, since these do not have to satisfy any requirements for high braking force dynamics. Here, legislators stipulate primarily a sufficient EPB action or parking brake action on steep gradients on slopes. In the case of self-locking reduction gear mechanisms, the gear ratio can also be selected to be high, which, in spite of poor efficiency, results in a motor with low power.

By contrast, in the case of the combination brake (EHC), the motor power is determined by the braking force dynamics and efficiency, which means that the motor cannot be dimensioned to be small despite the relatively low electrical braking action at the rear axle. The electronic open-loop and closed-loop control unit (ECU), which is positioned with the complete electrical control means at the brake caliper, is expensive owing to the high temperatures, and the failure rate is accordingly high. Force sensors are required for exact setting of the braking force. Without additional measures, this combination brake (EHC) does not satisfy the "fail operational" (FO) requirements for higher levels greater than 4 (according to the VDA/SAE standard).

In the case of the known combination brakes with simple safety, if the hydraulic braking device fails, electrical braking is performed at the rear axle and vice versa. Such a failure however leads to considerable losses in braking power of up to more than 50% in the event of failure of the hydraulically braked front-axle brake. A failure of the electric brake moreover possibly leads to the failure of the immobilizing brake. Self-locking reduction gear mechanisms are therefore used. Here, there is however the problem that, in the case of an electric service brake being used in the event of blocking of the gear mechanism during travel, the brake can quickly overheat, with the risk of fire, in the case of very high braking power.

Also known are electric parking brakes (EPB) with hydraulic assistance and with a motor of reduced size, as presented for example in DE 198 17 892. These have however not become established because, in the event of failure of the hydraulics, a failure of the immobilizing brake also occurs.

OBJECT OF THE INVENTION

The invention is based on the object of providing a cost-effective and reliable electromechanically actuatable wheel brake module for a brake system or a fail-safe and cost-effective brake system for autonomous driving (AD) of level 3-5 with an integrated wheel brake module.

Achievement of the Object and Advantages of the Invention

The object of the invention is achieved by means of the features of patent claim 1.

The basic concept of the solution according to the invention is to provide a wheel brake module for a brake system or a brake system with at least one pressure supply with a wheel brake module at at least one wheel brake, in particular at two wheel brakes, in the case of which a braking torque can be generated both electrically and hydraulically by means of a wheel brake with high fail safety. This type of brake according to the invention will be referred to below as a hydraulically-electromechanically actuatable brake or H-EMB or H-EMB module for short. The H-EMB module or brake system with H-EMB module is suitable for brake systems for AD level 3 to level 5. This is achieved in that the electromechanically actuatable wheel brake has a hydraulic adjustment device with a piston-cylinder unit, the adjustment piston of which serves for the adjustment of the brake piston and/or the exertion of a force on the brake piston, wherein the adjustment piston is adjustable, or a force is exertable on the adjustment piston, by means of the pressure supply device, in that the pressure supply device builds up a pressure, which leads to the adjustment of and/or exertion of force on the adjustment piston and thus the brake piston of the wheel brake.

Depending on the configuration of the brake system for the overall vehicle, the H-EMB module must be designed accordingly. Said module may be configured in terms of its embodiment so as to be designed only for emergency braking functions, in the event of failures in the vehicle brake system, for example brake circuit failure, failure of a pressure supply, and parking function. For this application, the motor of the H-EMB can then be made very small and need only have a very low power. In a second possible embodiment, the H-EMB may be configured such that sufficient braking force dynamics are achieved by means of a corresponding increase of the power of the H-EMB motor and the use of a gear mechanism with preferably better efficiency and thus less hysteresis in force build-up and force dissipation. The H-EMB module can then also be used in regular operation, such as ABS and ESP functions or recuperation, torque vectoring or assistance of the primary pressure supply of the AEB function.

The above-described hydraulically-electromechanically actuatable wheel brake modules H-EMB are advantageously arranged at the wheels of the rear axle of the motor vehicle, wherein the pressure supply device is also used for the closed-loop and/or open-loop pressure control of the hydraulic brakes of the front axle. Here, the H-EMB module is used both for normal braking force generation/regular operation during driving operation and as an electric parking brake with an advantageous self-locking or mechanical arresting mechanism. This is necessary because a vehicle on a slope could start moving in the event of failure of the onboard electrical system. The self-locking mechanism is not imperative if a separate, cost-effective non-electrical parking brake solution is provided. This may for example also be a transmission lock.

If the H-EMB module is used in electric vehicles or hybrid vehicles, a powerful electric motor is also available for generating braking force. The electric motor is used for the recuperation control, but can also generate braking force in the event of failures in the superordinate hydraulic brake system and can advantageously also be taken into account in the design of the H-EMB. Here, the maximum speed and weight of the vehicle must be taken into account, because the deceleration that can be achieved by means of the electric motor is determined primarily by the maximum torque of the electric motor, maximum speed and weight. The action is less pronounced in the case of vehicles with a high maximum speed (200 km/h) than in the case of simple electric city vehicles with low maximum speeds and low weights.

The first gear mechanism of the H-EMB is advantageously of self-locking design. Thus, in a preferred embodiment, the drive motor of the hydraulically-electromechanically actuatable brake may drive a worm which drives a gearwheel. The gearwheel in turn drives the spindle of the downstream spindle drive, which adjusts the brake piston. The spindle drive may in this case advantageously be formed by a ball-screw drive, abbreviated as KGT, the spindle of which is mounted axially displaceably in the housing of the electromechanical brake. In order to allow an axial movement of the spindle relative to the gearwheel, the spindle may for example have a toothed region which extends in an axial direction and which interacts with an internal toothing of the gearwheel. Here, the internal toothing has an axial length smaller than the axial extent of the toothed region of the spindle, such that a sufficiently large axial stroke of the spindle is possible over which the gear-wheel meshes with the toothed region of the spindle. The toothed region of the spindle may be implemented for example by a pinion connected rotationally conjointly to the spindle. This ensures that the motor torque of the drive motor of the electromechanical brake can always act on the brake piston.

The adjustment piston of the hydraulic adjustment device of the electromechanical brake advantageously acts on the further gear mechanism, in particular the spindle of the ball-screw drive. A stop on which the adjustment piston acts is advantageously provided. A damping element may thus also be provided between the adjustment piston and the stop in order to avoid impacts and the associated generation of noise. The adjustment piston is arranged axially displaceably in a cylinder, wherein hydraulic medium can be conveyed into or out of a working space delimited by the adjustment piston by means of the pressure supply device, whereby an axially acting force acts on the adjustment piston and moves this either in the direction of the stop or brake piston or away from this.

The spindle may advantageously be mounted axially displaceably in the adjustment piston, which results in a particularly compact and simple design. If a force is now exerted by the adjustment piston on the spindle or on the stop thereof, the spindle is displaced axially relative to the gearwheel of the first gear mechanism. The spindle should also be mounted in the adjustment piston so as to be freely rotatable in the circumferential direction, such that a rotation of the spindle is not transmitted to the adjustment piston.

The adjustment piston may be held in a central position for example by means of a spring, if no force is exerted on the adjustment piston by means of the pressure supply device.

By means of the above-described exemplary construction, a braking torque can thus advantageously be generated both by means of the drive motor of the hydraulically-electromechanically actuatable brake or by means of the hydraulic adjustment device thereof, whereby, in effect, redundancy is created, and increased safety is attained. The drive side of the hydraulically-electromechanically actuatable brake may also be implemented redundantly, for example by virtue of the control unit and/or the electric motor being implemented redundantly and/or the control unit and/or the electric motor being supplied with on-board voltages for example by means of two on-board electrical systems, or else the electric motor having for example a doubly redundant multi-phase system, whereby the drive motor can still be driven even in the event of failure of one of the multiple, in particular two, multi-phase systems.

The redundant measures described above, such as for example redundant electrical supply, control units, data lines, etc., may be implemented analogously for the overall brake system or its individual components, that is to say not only in the case of the hydraulically-electromechanically actuatable brake but for example also in the case of the pressure supply device.

In the brake system according to the invention, the brake piston of the hydraulically-electromechanically actuatable wheel brake is thus advantageously electrically and/or hydraulically adjustable by means of the electromotive drive and/or by means of the pressure supply device, in particular to achieve the full service braking action. Furthermore, for the parking brake function, the electric motor of the H-EMB can be reduced in size in that, in the locking module, the electric motor is assisted by means of the hydraulic pressurization, and said electric motor can thus be designed with low power/torque and can thus be dimensioned to be smaller and be more cost-effective. This is possible in particular when, and can absolutely reliably assist the parking lock function even in the event of a fault if, the pressure supply of the primary brake system is implemented redundantly as discussed above (2×3 phases, redundant on-board electrical system) or two pressure supplies are provided in the brake system. The assistance function for the parking brake function is then ensured even in the event of a fault. Only in this way can such a parking brake function satisfy the requirements of a reliable parking brake function even in the event of faults such as failure of the pressure supply. If, by contrast, the electric motor of the H-EMB is configured such that a sufficiently high parking brake torque can be built up for all critical parking processes on a slope under all conditions, no redundant pressure supply is required. A brake system may however then only satisfy AD level 2-3.

The electromechanically actuatable wheel brake may advantageously have a device to prevent an in particular complete blocking of the adjustment and/or to ensure the braking action for an increase or reduction of the braking torque.

The great advantage of the embodiment according to the invention is that the hydraulic actuation and mechanical actuation of the H-EMB can take place completely independently of one another. All options for simultaneous braking torque build-up and fail-safe redundancy are thus provided. This can be used to significantly simplify the brake system and in particular reduce the number of its components, for example the number of outlet valves. Furthermore, the possibility of simultaneous braking torque build-up and braking torque dissipation at different brake pressures at different wheel brakes, for example the wheel brakes of the rear axle with integrated H-EMB, can be used very effectively to improve the quality of the recuperation control and torque vectoring. This means that a multiplex process can be omitted or the multiplex process can be simplified from 4-channel operation to 2-channel operation.

Another basic concept of the solution according to the invention is that, in the case of a combination brake system with a hydraulic brake at the front axle (VA) and electrical or electromechanical brake at the rear axle (HA), one or more (hydraulic and/or electrical) components or subsystems of the brake system are implemented redundantly.

The design according to the invention makes possible a reliable immobilizing brake and the use of motors with lower power, since TTL requirements are satisfied by the hydraulic assistance and the electric brake does not have to satisfy any TTL requirements. The hydraulic adjustment acts by means of the adjustment piston, which acts on the brake piston of the wheel brake via a spindle (without rotation of the latter) with a ball-screw drive (KGT). This makes possible a fast build-up of the braking torque, up to the level of the locking limit. The remainder of the increase takes place with the electric brake via gear mechanism and ball-screw drive (KGT) (in the adjustment piston); this does not require a high actuation speed.

The ABS operation with build-up and dissipation of the braking torque is also expediently performed electrically, because normally no high adjustment speeds are required for this. In the case of major changes in the braking action, such as a μ step change, it is preferably the case for fast and highly dynamic adjustment that only the hydraulic control is effective. In the event of failure of the electrical adjustment, the hydraulic adjustment according to the invention takes effect. Otherwise, the electrical adjustment acts alone, for example in the event of failure of the pressure supply (DV) of the hydraulics. In the case of the front axle (VA) and the rear axle (HA), the foot-imparted force then continues to act on the master cylinder (HZ) to assist the electrically actuated brake of the rear axle and the braking action thereof. This situation is extremely rare owing to the many redundancies in the case of seals of the piston-cylinder units (pressure supply DV, master cylinder HZ, travel simulator WS), valves and electric motor with 2×3-phase control, all features for so-called "fail-operational" (FO). In the case of this concept, the parking lock of the combination brake (EHC) for the immobilizing brake function, which should be implemented redundantly for FO requirements, is also omitted.

It is also essential in the concept according to the invention that the hydraulic adjusting device or the hydraulically actuated adjustment piston acts on the brake piston via the gear mechanism (KGT), in particular via a spindle of the gear mechanism (KGT). Here, a pinion is expediently provided between the motor gear mechanism for transmitting the electric motor torque and the gear mechanism (KGT) in order to transmit the drive force of the motor to the brake piston. Here, the pinion allows an axial displacement of the spindle with respect to the motor gear mechanism, in particular of a worm wheel in which the pinion is arranged displaceably. Thus, in the event of blocking of the gearwheel drive of the motor gear mechanism, the hydraulic adjustment piston can impart the braking force. Details of the adjustment even in the event of different faults are discussed in the description of the figures. The movement/function or position of the adjustment piston may be monitored by a sensor. Alternatively, the movement of the adjustment piston may also be measured by means of the delivery rate of the pressure supply.

With a redundant immobilizing brake, the mechanical parking lock can also be omitted, which is considerably more complex in the case of a purely electric drive than the parking lock in the case of automatic transmissions.

The purely electrically actuated brake (EMB) requires a force transmitter (KG) for the adjustment piston, because the motor current measurement is too inexact, in particular because the actuation is performed via a worm gear mechanism and the efficiency of the worm gear mechanism and the variation thereof during operation with temperature changes and wear cannot be ascertained in a sufficiently reliable manner. The force transmitter is complex and must also be implemented redundantly in the case of FO requirements. With the hydraulic adjustment piston, the pressure measured in the pressure supply determines the braking torque, as is conventional. In the case of the H-EMB with hydraulic actuation via the adjustment piston, the torque calculation by means of motor current measurement is used, which has been determined previously in a characteristic map with comparison of the hydraulic pressure $i=f(p)$. The friction loss variable of spindle gear mechanism efficiency between the motor and the wheel brake, and also the hysteresis effect thereof, are thus also taken into account. The current measurement is therefore sufficiently exact. This can be refined by virtue of the temperature of the motor being determined in order to additionally take into account the influence of the motor temperature on the torque constant of the electric motor. This results in a characteristic map $i=f(p,T_{motor})$. In future vehicle concepts, the installation space in the engine compartment, in particular in an elongation of the brake pedal, is very constricted. There will no longer be space for current brake force boosters (electric boost) or tandem master cylinders.

For the hydraulic system of the front axle, the simplified 1-box solution can be made very short, approximately only 50% of the overall length of the known braking force system solutions. The concept may also be configured as a 2-box solution, in which only a 1-circuit master cylinder or an electric pedal is attached to the bulkhead, with an extremely short structural length, approximately 25% of the length of a typical 1-box solution. This requires two hydraulic connections from the master cylinder to the unit, comprising a brake line and a line from the reservoir to the unit and also redundant signal lines. The concept for the single-circuit hydraulic control of the front axle and of the rear axle may be implemented partially or fully redundantly, in order that the highest fail operational requirements are met.

In the case of the known EHC according to the prior art, the complete controller (ECU) is provided on the brake caliper. Here, the prevailing temperatures are sometimes high and the installation space is limited. In the solution according to the invention, a slave ECU is used for the H-EMB with a redundant on-board electrical system connection via bus lines. The function of the motor control and also the sensor evaluation may, according to the invention, be implemented redundantly. The central computing may be performed in the ECU of the brake system, as shown by way of example in FIGS. 2 and 3, or in accordance with a domain structure in a central master ECU/M-ECU, as shown by way of example in FIGS. 4 and 5.

The concept according to the invention may, in the case of corresponding requirement, be of modular configuration with regard to the requirements for packaging as a 1-box (all components of the hydraulic brake system excluding H-EMB integrated) or 2-box (brake system as first module, separate actuation unit/electric pedal as second module), with or without master cylinder HZ and also from level 3 to level 5 in terms of safety, with reduced redundancies and correspondingly lower costs.

Permanent diagnosis, in particular of hydraulic leaks, during operation and full diagnosis during parking are essential for the redundant functions. With the measures described above, fail operational level can be achieved, which is required for autonomous driving AD level 4 (according to VDA/SAE definition "no driver required in the specific usage situation") or "driver required in the event of a fault" and AD level 5. Braking with a deceleration of 0.5-0.7 g can be achieved even in the event of a fault, such that, according to ECE regulations, the vehicle does not have to be parked immediately after the fault has occurred and also no red warning lamp is activated.

According to the above, the fully or partially redundant open-loop and closed-loop control device ECU is also connected to a redundant onboard electrical system. This has at least two power supplies with a voltage of 12 to 800 V. In the future, a 12/48 volt on-board electrical system will be standard in many vehicles. It is advantageous here for the open-loop and closed-loop control device ECU, which controls electric motors of the pressure supply and optionally also of the H-EMB with 2×3-phase connections, to supply the higher voltage (for example 48 V) to a section with for example 3-phase or n-phase motor control. As an alternative to the 2×3-phase connection, the so-called railway circuit with a B8 bridge with eight power semiconductors may also be used, where the full function of the B6 bridge for the EC motor control and thus the full power of the motor is still ensured in the event of failure of one power semiconductor. This variant is an alternative with fail safety similar to that of a 2×3 phase configuration. Owing to the higher voltage, the performance of the motor and thus the dynamics can be significantly increased. In addition, the higher voltage can be used for down-sizing of the electric motors of the pressure supply and H-EMB.

According to the invention, multiple implementation of the redundancy is also possible, as is known for example in the case of other systems with very high safety requirements (such as controllers in aircraft technology and nuclear power plant technology), for example in the case of aircraft a triple redundancy with a "2 out of 3 circuit" in the event of a fault. The selection of the redundancy is based on the reliable fault detection or also fault detection by plausibility checking. For example, the failure of a seal in a closed system can be reliably detected on the basis of a change in volume, change in pressure or change in position of a piston system during operation or during a special diagnostic cycle. By contrast, this is more difficult in the case of an electrical circuit or sensor circuit. The abovementioned "2 out of 3 circuit" is often used here, that is to say if two of three signals are identical, this configuration is selected. In the case of sensors, it appears expedient to use two redundant sensors with evaluation circuits, for example "2 out of 3". Aside from the diagnosis, the plausibility checking of signals or diagnosis results is also decisive.

Exemplary embodiments of the invention and its refinements and further individual features, combinations of features and advantages of the invention will emerge from the following description of the figures, which refers to the drawing.

Figure 1A:
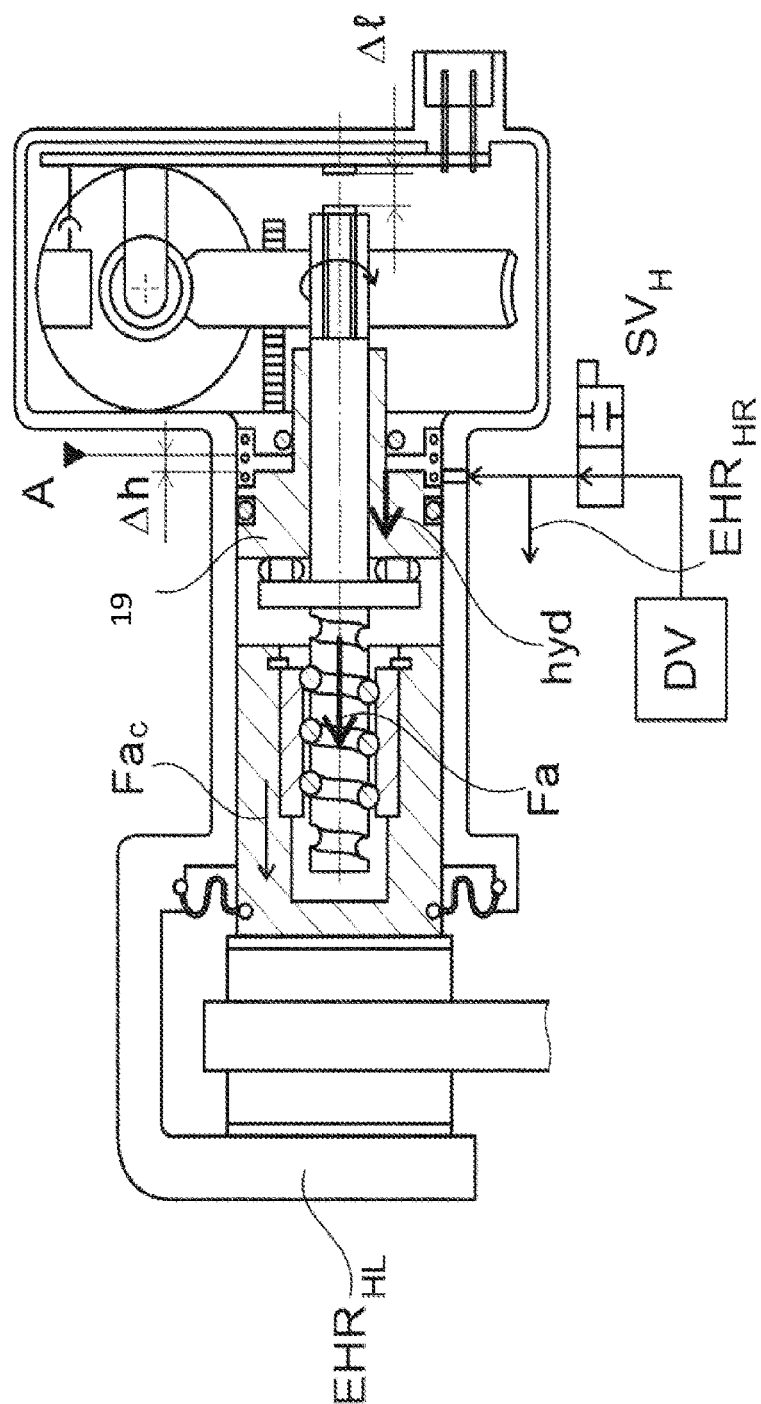
Figure 2:
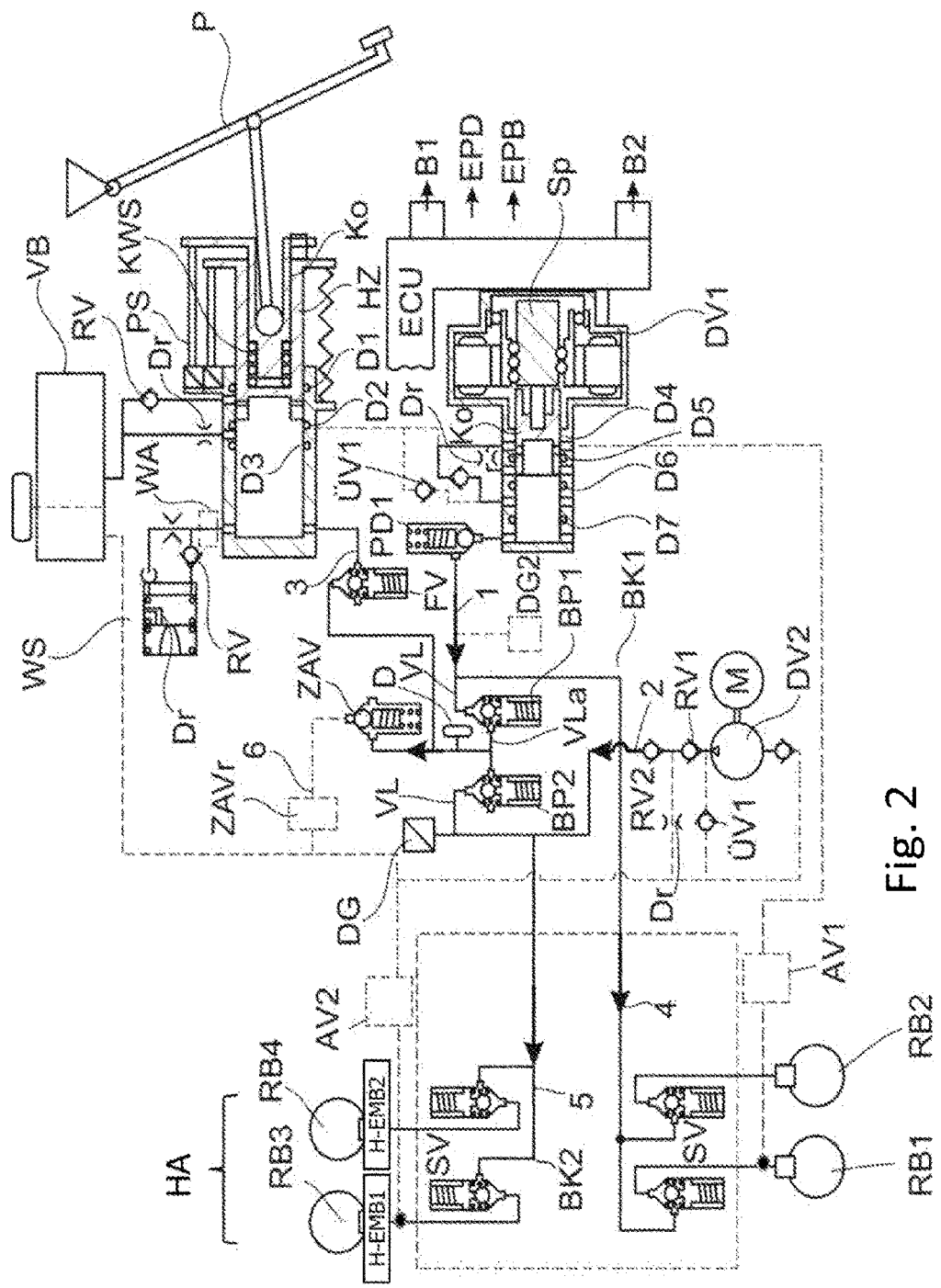
Figure 3:
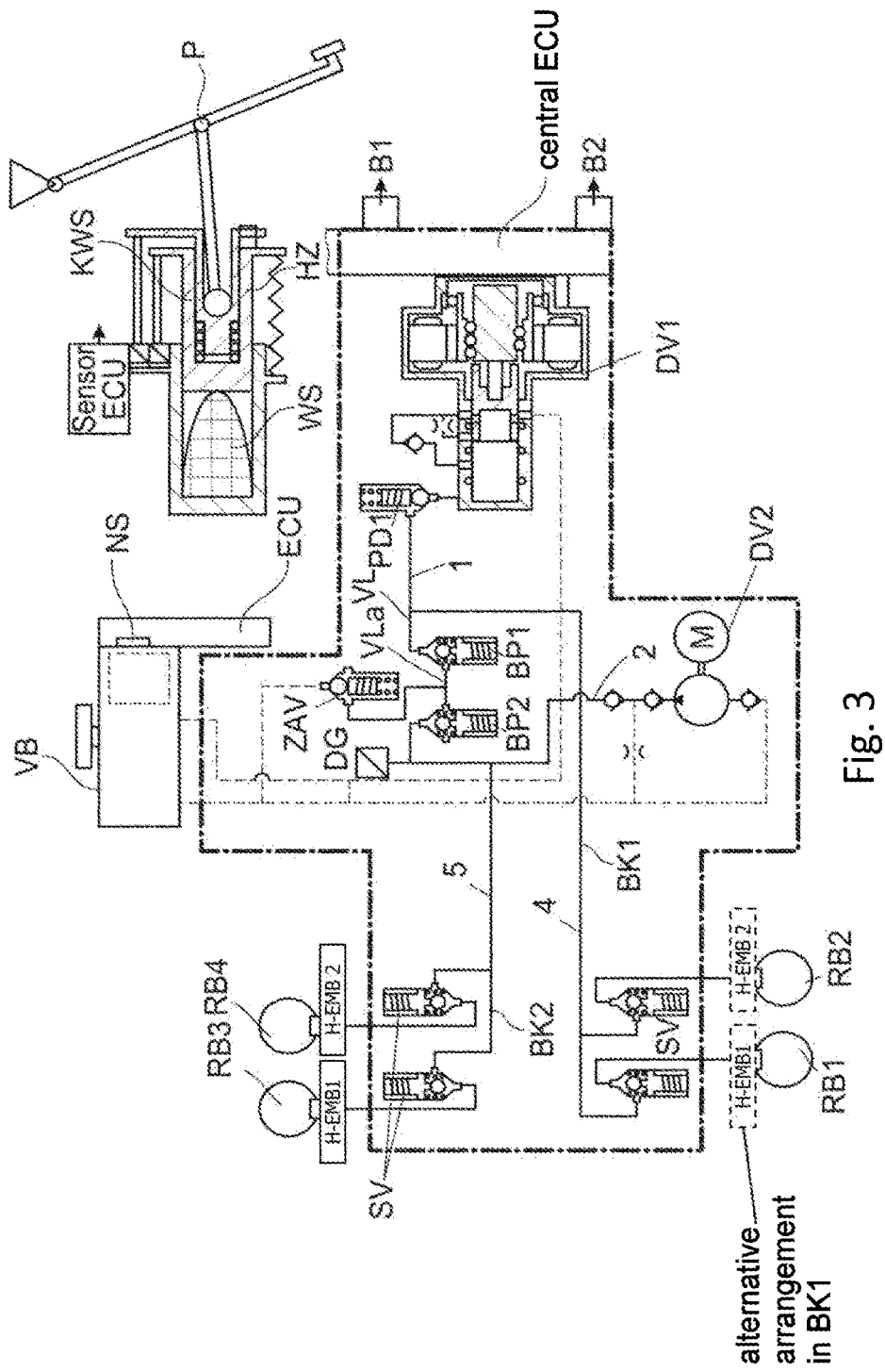
Figure 4:
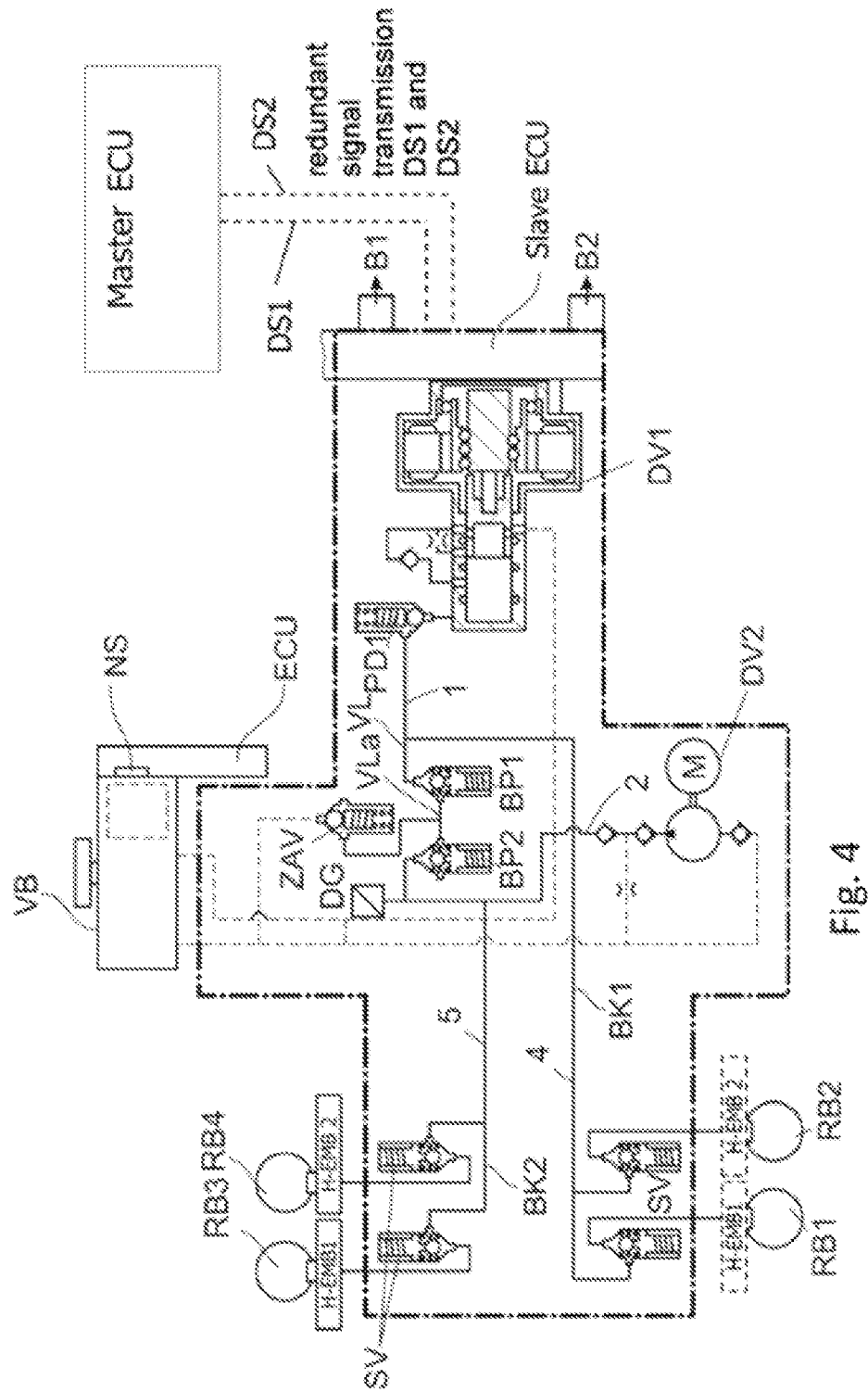
Figure 5:
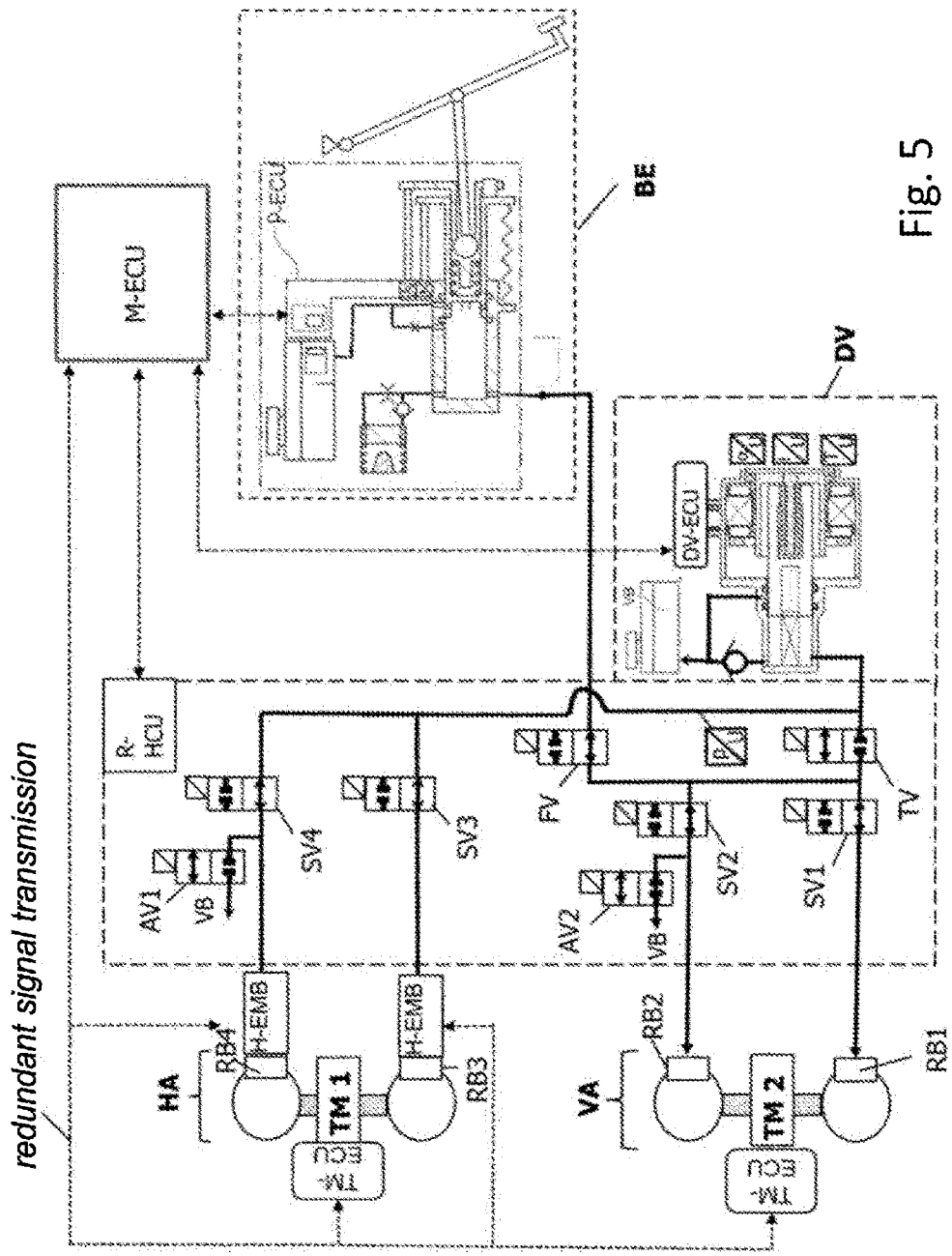
Figure 6:
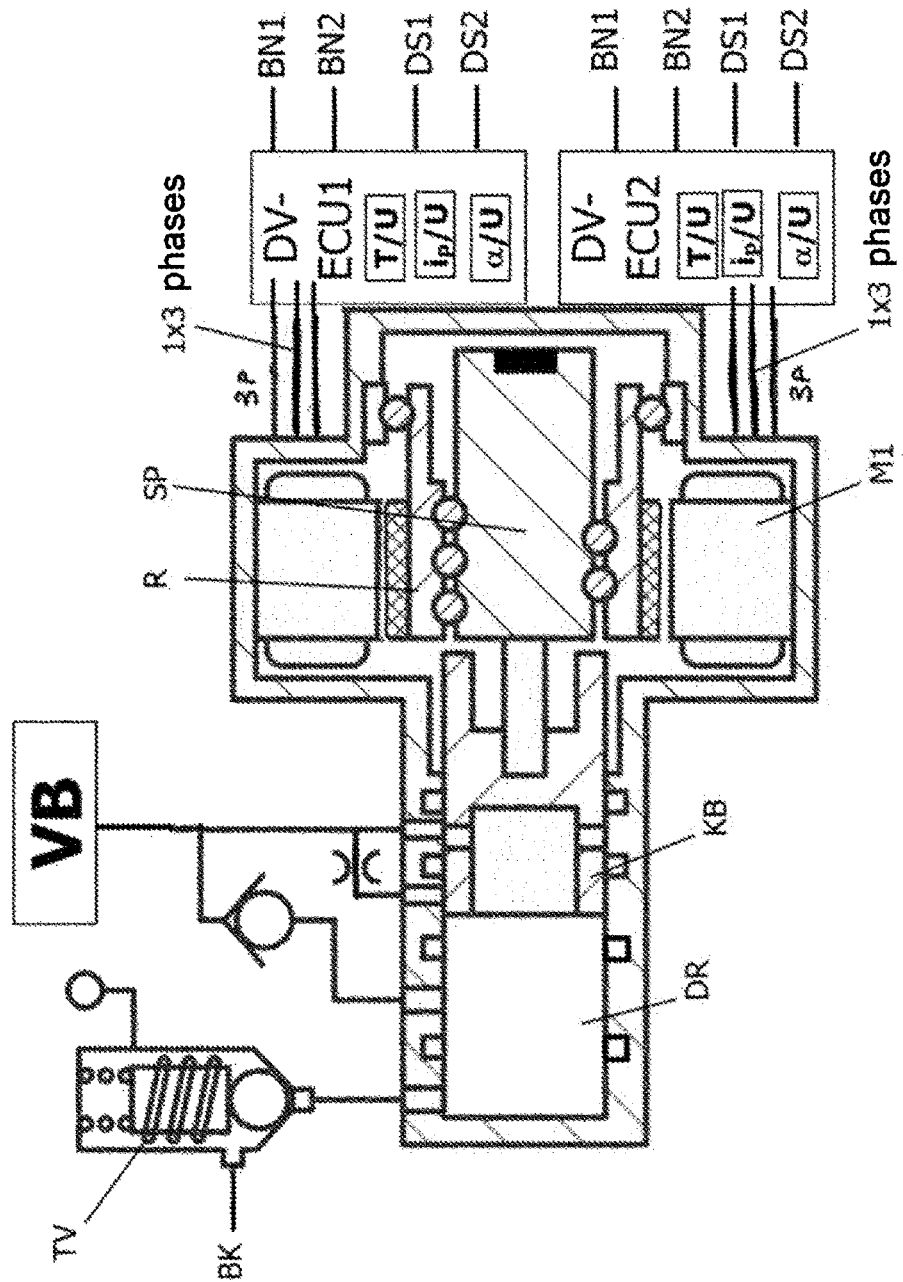
Figure 7A:
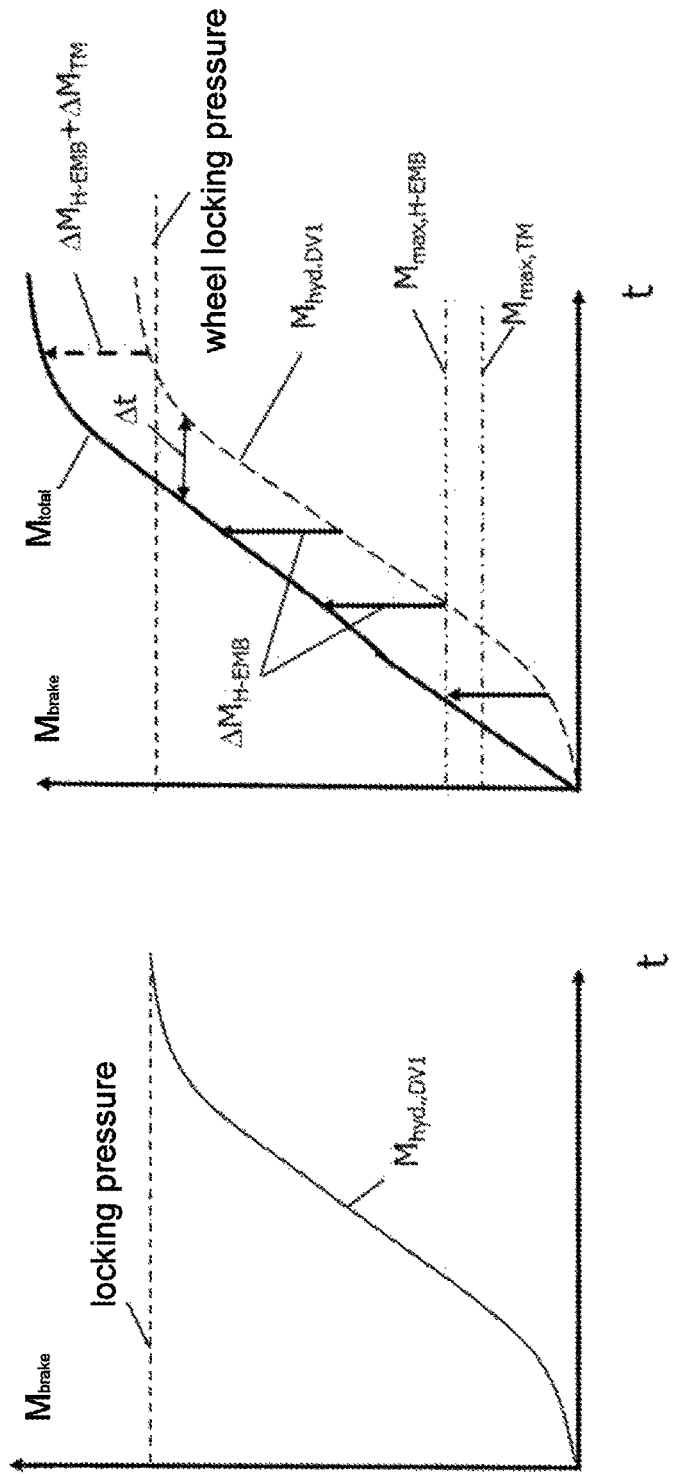
Figure 7B:
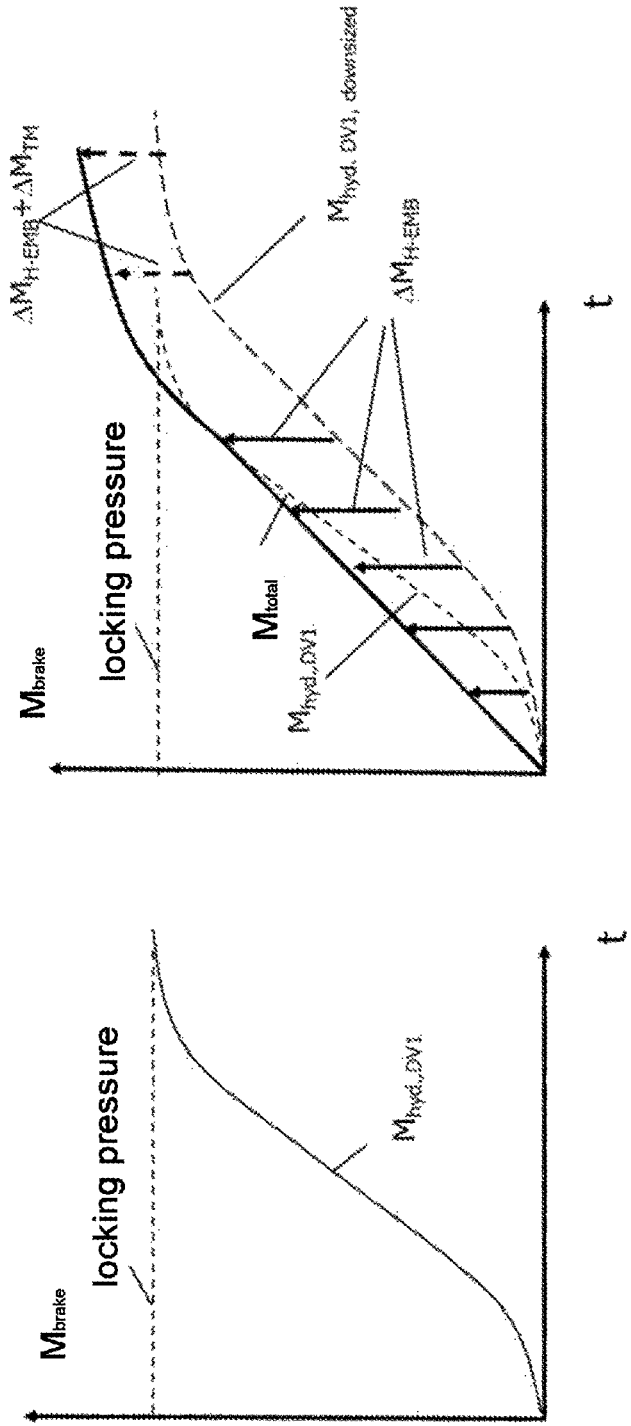
Figure 7C:
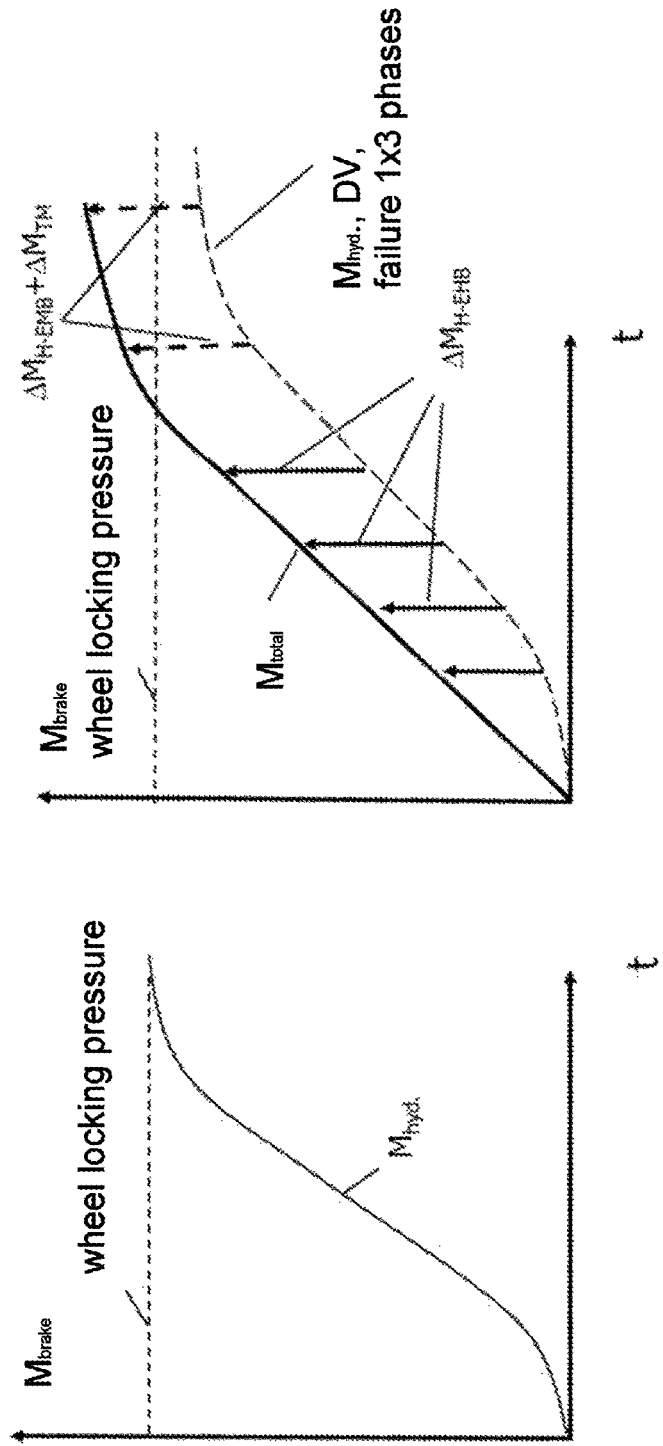

In the drawing:

FIG. 1: shows a first embodiment of the H-EMB;

FIG. 1a: shows control of the H-EMB with deployment of the adjustment piston by means of pressure;

FIG. 2: shows a first possible embodiment of a brake system according to the invention for AD level 3-4 with a fail-safe valve arrangement for connecting the two brake circuits, with a master cylinder with actuating device, and with two pressure supply devices with electronic open-loop and closed-loop control device as a so-called integrated 1-box system;

FIG. 3: shows a brake system according to the invention for AD level 3-4 with an electric pedal;

FIG. 4: shows a brake system according to FIG. 3 but without a brake pedal for AD level 5 and with a superordinate open-loop and closed-loop control unit Master ECU;

FIG. 5: shows a further possible brake system for city and small vehicles for AD level 3-4, in the case of which hydraulically assisted electromechanical brakes are arranged at the rear axle and electric drive motors TM1, TM2 are arranged at one or more axles;

FIG. 6: shows a pressure supply device with two open-loop and closed-loop control devices and redundant diagnosable seals;

FIG. 7a: shows torque diagrams to illustrate the braking force assistance by means of hydraulically assisted electromechanical brake and traction motor;

FIG. 7b: shows torque diagrams to illustrate the down-sizing possibility of the pressure supply device, provided that braking force assistance is provided by means of hydraulically assisted electromechanical brake and traction motor;

FIG. 7c: shows torque diagrams to illustrate the braking force assistance by means of hydraulically assisted electromechanical brake and traction motor in emergency operation in the event of failure of components of the brake system.

FIG. 1 shows the construction of an electromechanical wheel brake H-EMB. A brake caliper 23 is illustrated in principle (without connection to the wheel carrier), which brake caliper, together with the brake piston 20 and the brake linings 27, acts on the brake disk 22 and thus generates the braking torque or the braking action. Two axial forces act on the brake piston 20, namely a. from the adjustment piston 19, which acts axially on the spindle 16 and the spindle nut 24 (without rotation) and b. from the electric drive, which acts via a worm wheel 17 and the spindle 16 with spindle nut 24, that is to say the ball-screw drive KGT.

The worm wheel 17 is driven by the electric motor 8 via a self-locking gear mechanism 15. Said electric motor is electrically connected via a plug connector to the printed circuit board (PCB) 26 of the electronic open-loop and closed-loop control unit (ECU) assigned to the wheel brake, as are a motor angle sensor 27 and a position sensor 28 with target 28a on the spindle. The position of the brake piston can be measured by means of the motor angle encoder and the axial movement of the adjustment piston 19 and of the spindle 16 with pinion can be measured by means of the position sensor 28. The adjustment piston 19 is axially adjusted by means of pressure generated by the pressure supply device and drives the spindle concomitantly. This displacement is detected by means of the position encoder 28. The adjustment piston has two seals D20 and D21, which may also be implemented redundantly.

The spindle nut 24 is axially fixed by means of a fixing element 24a, such that the brake piston 20 with the spindle 16 can be adjusted in both directions, which is necessary for the setting of the so-called lining clearance BLS, as known from EP 2225133B1, between the brake disk and the brake lining. As is known, the customary residual application force of the brake piston 20 gives rise to friction which is not negligible with regard to the $CO_2$ emissions. The setting of the lining clearance BLS by means of the setting parameters of adjustment travel and current is known from modern parking brakes. According to the invention, this clearance is preferably performed only by means of the electrical adjustment by the electric motor of the H-EMB. The axial force of the spindle is absorbed by an axial bearing which is arranged on the spindle 16 between a disk, which is firmly connected to said spindle, and the adjustment piston 19.

The adjustment piston 19 is reset into the initial position primarily by the resetting forces of the brake caliper 23 via the brake piston 20, and additionally possibly by means of a piston resetting spring KF into the position A, when said adjustment piston is in a −h position. The position +/−h is measured by the position sensor 28 and can additionally be blocked in this position in the case of a closed SVH. From the starting position A, the piston stroke h can act and also be measured in both directions +/−h.

This spring KF can also be preloaded by means of a stop ring (not illustrated).

If gear mechanism blocking now occurs after a pressure build-up or an increase in braking torque, the adjustment piston 19 can be reset into the initial position A by the resetting forces of the brake caliper 23 on the brake piston 20 in a manner dependent on the stroke contribution of the electrical adjustment. If said stroke contribution is less in the case of the pressure dissipation than in the case of the pressure buildup (approximately 5-10%), a residual travel Δh is generated which then leads to −h at the initial position, in order that no residual braking action remains.

In the case of the non-electrical adjustment, the adjustment piston 19 is blocked by the closed valve $SV_H$ or $SV_{HL}$ and $SV_{HR}$.

After repair of the gear mechanism blocking, Δh=0 is then set again for position A. It should be mentioned that, with an appropriate construction, gear mechanism blocking will seldom occur. However, owing to the critical effects, solutions must nevertheless be provided for this case.

Adjustment strategies other than the aforementioned adjustment strategies a) for hydraulic adjustment are also conceivable, for example b) electrical adjustment of only the immobilizing brake or c), in the case of fast braking torque build-up, hydraulic adjustment and, in the case of slow braking torque build-up, only electrical adjustment. Here, a complicated mixed adjustment can be omitted, that is to say position A is the same as the stop, and −h does not exist.

Below are some remarks on the power balance of the motor 8. Owing to the poor efficiency of the self-locking gear mechanism, the motor 8 requires more power by approximately a factor of two. As already stated, the motor 8 of the H-EMB needs to be configured in terms of power only such that it builds up the pressure up to the locking pressure more slowly by a factor of 3, since the fast adjustment is done by the hydraulic adjustment and lower adjustment speeds are required for ABS/ESP. In the balance, a gain of 33% is advantageously achieved, and furthermore, savings in the case of the gear mechanism and the omission of the parking locks in the transmission are possible owing to the redundant control with a redundant on-board electrical system of appropriate size.

FIG. 1a shows an activated adjustment piston 16 which receives volume at the corresponding pressure from the pressure supply device DV and the open valve $SV_H$. The pressure supply DV controls the pressure in accordance with the characteristic map of the pedal travel sensors for the rear axle HA, reduced by approximately 5 to 10%. The remaining amount up to 100% is provided by the electrical adjustment by means of a characteristic map of the adjustment travel by means of motor and motor sensor. The motor current may possibly additionally be used for this purpose. The characteristic map is recorded versus the hydraulic pressure of the pressure supply device DV, which yields a ΔI adjustment travel. This adjustment travel, which is proportional to the pressure, can then also take place from the characteristic map, which is proportional to the stroke of the pressure piston 19, by means of the electric drive by means of the motor sensor. This stroke delivers, by means of the surface area of the piston 19, a volume which leads to a pressure which is proportional to the pressure-volume characteristic curve (p-v characteristic curve) of the connected brake circuit. This characteristic curve or this characteristic map is updated in particular operating states, as is known for example from DE 10 2005 055751, to which reference is made here in this respect. The pressure can be determined at any time from this characteristic map and additionally measured by means of the pressure transducer DG (see FIG. 2). With this possibility of evaluating the piston travel from the volume of the pressure supply device DV, there is also the potential to omit the position sensor, in particular in the case of the adjustment strategy b. and c. described above. The motor current may additionally be used, with a preferably separate characteristic map. For this purpose, various pressure levels are input by the adjustment piston 19 by means of pressure transducer DG by means of the pressure supply device DV, for example from 10 bar in 10 steps up to 100 bar. At the corresponding step, the pressure is kept constant and the motor current is increased until a motor rotation and spindle movement occur. The measurements then yield a motor current proportional to the pressure. This eliminates all tolerance factors on the motor current. The characteristic map may also be used for the pressure dissipation and the corresponding current reduction.

A complex force sensor is required for the exact setting of the braking action. As shown in FIG. 1a, the electrohydraulic control of the H-EMB may be switched by means of a common $SV_H$ for all H-EMB modules or, as shown in FIG. 1a, by means of one $SV_H$ individually for each H-EMB module. The adjustment strategy a, b and c is decisive here. If H-EMB is integrated into the brake system, the wheel-specific switching valve SV of the brake system (embodiments of FIGS. 2-4) is used and no $SV_H$ valve is required.

The electric immobilizing brake may also act for a limited time, for example in the event of failure of the electric motor, by means of the hydraulic adjustment. After the occurrence of a fault, the pressure supply DV acts with the corresponding pressure. This is held after $SV_H$ closes. The pressure supply DV and the pressure transducer DG can check, at short time intervals, whether the $SV_H$ is leak-tight, that is to say exhibits no pressure loss. The time interval can thereafter be configured to be long. This requires a particular wake-up mode for the open-loop and closed-loop control unit ECU, which is maintained until servicing personnel arrive or the parking situation of the vehicle is no longer critical, for example on a slope, such that the second H-EMB, which is still intact, is sufficient. The H-EMB according to the invention thus has clear advantages over a classic electric parking brake in terms of the redundant function. In particular, if there is a redundant pressure supply or two pressure supply devices in the primary brake system, this redundancy is increased even further, such that a classic mechanical parking brake with cable or electromechanical parking brake can be omitted, which significantly contributes to simplifying the vehicle architecture and reducing costs.

FIG. 2 shows the basic elements of a complete brake system with wheel-specific brake force control, in which H-EMB modules can be advantageously integrated at the wheel brakes of the rear axle HA or wheel brakes of the front axle. The switching valves SV are used for the hydraulic actuation of the H-EMB. Here, a pressure in the H-EMB module can be confined by closing the switching valve SV and, even in the closed valve state, pressure modulation can be performed by means of the electric motor of the H-EMB by back-and-forth movement of the adjustment piston 19 of the H-EMB. For the pressure dissipation when the SV valve is in a closed state, an outlet valve AV1, AV2 is required on the H-EMB module. In the figure, only one AV2 is provided at the wheel brake RB3, such that the pressure dissipation with the SV valve closed can take place only at the wheel brake RB3/H-EMB1 module. The second outlet valve AV1 is in the brake circuit BK1 at the wheel brake RB1. As an alternative to the illustration, it is also possible for the second outlet valve AV1 or another outlet valve (not illustrated) to be positioned at the wheel brake RB4/H-EMB2 in order to allow a pressure dissipation here also with the switching valve closed. The H-EMB modules may alternatively also be used at the front axle and used for improving the control dynamics through the further degrees of freedom of braking torque build-up and braking torque dissipation by means of the electric motor of the H-EMB. Here, in the case of heavy vehicles with large brakes at the front axle, the focus of the function is on control. For this usage situation, outlet valves AV1 and AV2 at the front axle are suitable for the pressure dissipation in the wheel brakes.

The overall brake system according to the invention with H-EMB is composed of master brake cylinder HZ with travel simulator WS and reservoir VB, two pressure supply devices DV1 and DV2, wherein the pressure supply device DV1 preferably has an electromotive piston control means and the second pressure supply device DV2 has a simple 1-circuit piston pump or gearwheel pump. Both act together with a valve circuit on the wheel brake cylinders RB, which transmit the controlled wheel pressure, for example in the case of ABS, to the brake. This corresponds to the prior art. It is however the intention for the hydraulic system according to the invention to exhibit a high level of fail safety for semi-automatic (HAD-AD level 3) or fully automatic driving (FAD-AD level 4).

As an alternative to the two typical wheel brake modules RB3 and RB4 of the rear axle HA, electromechanical brakes H-EMB1 and H-EMB2 according to the invention, as described in FIGS. 1 and 1a, are provided, wherein the pressure supply DV thereof may be realized by means of the pressure supply devices DV1 and/or DV2.

All failure-relevant components should be taken into account, such as for example valves, sensors, seals, motors, brake circuits. The following components or hydraulic connections should therefore advantageously be designed to be fail-safe:

(1) connection from the pressure supply device DV1 provided for the first brake circuit to the second brake circuit BK2;
(2) connection from the pressure supply device DV2 provided for the first brake circuit to the first brake circuit BK1;
(3) connection from the pressure chamber of the master brake cylinder HZ via the valve FV to the brake circuits BK1, BK2 via the valves BP1 and BP2;
(4) connection from valve PD1 and valve BD1 to the wheel brake cylinders RZ via the respective switching valves SV assigned to the wheel brakes;
(5) connection from valve BD2 to the wheel brake cylinders RZ via the respective switching valves SV assigned to the wheel brakes;
(6) connection from a brake circuit BK1, BK2 to the storage container VB;
(7) connections between brake circuits BK1, BK2 to the wheel brake cylinders RZ.

These hydraulic connections with possible faults of the individual components will be described below.

The pressure supply device DV1 acts from the brake circuit BK1 into the brake circuit BK2 via the hydraulic lines 1, 2 and 5 via the switching valves SV to the wheel brakes RB. In the prior art, only a single bypass valve is used for this purpose. Here, a valve failure can cause a total failure of the brake if, in addition to this, there is a dormant fault in a further valve. The invention therefore provides two redundant valves BP1 and BP2 in order to permit the connection to the brake circuit BK2 from the first pressure supply device DV1. Dormant faults of the valves BP1 and BP2 are identified by the pressure transducer by virtue of the valves being short-circuited during pressure variation. In this phase, the pressure must remain constant. In the event of failure of the first pressure supply device DV1, for example in the event of failure of a piston seal, a reaction on brake circuit BK2 via the three redundant valves BP1, BP2 and PD1 is prevented. The valves are preferably normally open valves in order that, in the event of failure of the pressure supply devices DV1, DV2, the master brake cylinder HZ can act on both brake circuits BK1 and BK2. If pressure is reduced by opening of the valves ZAV or FV, then the two connecting switching valves open automatically, without dedicated electrical activation, owing to the differential pressure.

Accordingly, the pressure supply device DV2 in the second brake circuit BK2 acts via the hydraulic lines 2 and 5 and via the valves BP2 and BP1 into the hydraulic line 4, and from there via the switching valves SV to the wheel cylinders RZ. In the event of failure of the BK in wheel brakes RB, the valves SV, BP1 and BP2 are closed beforehand by diagnosis and prevent a failure of the pressure supply. Here, all valves, for example SV, BP1, BP2, must be considered safety-critical as dormant faults, because the hydraulic medium flowing through the valves contains dirt particles which can prevent the valve from closing, and the valves therefore leak. In the present case, for example in the event of failure of one switching valve SV, one brake circuit may duly fail. The other brake circuit is however safeguarded by the interconnection of the two valves BP1 and BP2. It would be necessary here for a triple fault to occur, that is to say it would be necessary for the two valves BP1 and BP2 to also fail, in order for a total failure to occur. At least one brake circuit is thus reliably protected against double faults and prevents a total brake failure. Safety against double faults, if dormant faults can occur, is a crucial safety feature for HAD and FAD. This also includes maintaining the pressure supply or the brake force booster in the event of a brake circuit failure.

Here, the pressure supply device DV2 may assist the other pressure supply device DV1 in the case of fast pressure build-up or pressure build-up above 120 bar and/or perform the supply of pressure in the event of fading through continuous conveyance and/or for the ABS function, and/or, in the event of failure of the other pressure supply DV1, take over the function thereof.

It is likewise possible that the pressure supply device DV1 takes over the pressure build-up for pressure ranges lower than or equal to 120 bar and for the ABS function. In the event of failure of the pressure supply device DV2, if the pressure supply device DV2 is designed only for a maximum pressure of 120 bar, only this maximum pressure of 120 bar is available for both brake circuits.

In the case of closed connecting valves BP1 and/or BP2, the two pressure supply devices DV1 and DV2 can adjust or set the pressure in their brake circuits BK1 and BK2 independently of one another.

The pedal movement is measured by means of redundant pedal travel sensors (PS), which simultaneously act on a KWS measuring element according to WO2012/059175 A1. The pressure supply device DV1 is activated with the signal of the pedal travel sensors, wherein the piston control causes the volume flow in the hydraulic main line 1 in the brake circuit BK1 and via the redundant BP1 and BP2 valves into the brake circuit BK2. The pressure supply device DV1 may be configured such that it acts only up to the locking pressure of for example 120 bar. The pressure supply device DV2 then delivers higher pressures, which conveys volume into the brake circuit BK2 and via the redundant valves BP1 and BP2 into BK1. Here, the pressure supply device DV2 may be a continuously delivering pump. If the brake system is poorly vented or if vapor bubble formation occurs with increased volume requirement, this is detected by means of the known pressure volume characteristic curve (p-v characteristic curve), with the result that the pressure supply device DV2 takes effect already at relatively low pressures. With regard to the pedal actuation, it should be added that this moves the piston Ko, which acts on the known travel simulator WS via the pressure proportional to the pedal force and thus determines the pedal characteristic. The travel simulator WS can normally be deactivated by means of a valve, in particular in the fall-back level in the case of failed pressure supply devices. In the case of redundant pressure supply devices, this is no longer relevant owing to the very low probability of failure.

The master brake cylinder HZ can be connected to the brake circuits BK1 or BK2 via the line 3, wherein the valve FV is arranged in the line 3 for the purposes of closing same. This connection is effective only in the fall-back level. If the line is connected to the connecting line of the two switching valves BP1 and BP2, the two valves BP1 and BP2 form a further redundancy. A customary connection from the FV directly into one of the two brake circuits BK1, BK2 would, in the case of a leaking valve FV, have the result that the brake circuit and thus the pressure supply act on the HZ piston, which conventionally leads to the deactivation of the pressure supply.

Different pressures or pressure levels act on the valve FV from the master brake cylinder and from the brake circuits BK1 and BK2. In the worst case, this may have the effect, for example in the event of failure of the on-board electrical system or of the open-loop and closed-loop control unit ECU, that an unfavorable pressure difference prevails at the closed valve FV and the valve FV cannot open, such that a pressure dissipation $P_{ab}$ is not possible. To prevent this, a further switching valve FVr is connected in parallel with respect to the valve FV, wherein the outlets and inlets of valves FV and FVr are connected to the line 3 in an interchanged manner, such that, in the presence of any pressure differences, it is ensured that at least one of the two valves FV, FVr opens automatically, that is to say even without electrical energization, owing to the differential pressure. In addition, this advantageously reduces the back pressure on the valves.

In the event of failure of one brake circuit in the wheel cylinder, the corresponding inlet valve EV or switching valve SV is conventionally closed, in order that the failed wheel circuit is eliminated. A leaking EV/SV (dormant fault) causes the failure of the brake circuit or of the entire pressure supply. Here, too, the valves BP2 and BP1 provide additional safety, such that the pressure supply does not fail. A failure of the brake circuit BK1 owing to a non-functioning switching valve SV means a failure of the pressure supply DV1, whereby the pressure supply to all wheel brakes that are still functional takes place via the other pressure supply device DV2.

Another failure may result from a fault of the check valve RV1 in the second brake circuit. The failure of the pressure supply DV2 can be prevented here by means of a redundant RV2. A throttle Dr downstream of the RV2 with a small pressure flow allows diagnosis, for example by way of a pressure drop.

A central outlet valve ZAV is required for the ABS control or for the pressure reduction with the second pressure supply device DV2. Here, the volume flow also passes via the valves BP1 or BP2, such that a leaking ZAV is not critical for normal operation, because, in the event of failure of the central discharge valve ZAV, the pressure control is performed by means of pressure supply devices DV1 and DV2. Furthermore, the fault, even dormant, of ZAV is immediately identified from a change in pressure or increased volume delivery of the pressure supply device DV1. In the case of normal braking up to approximately 120 bar, the pressure supply DV acts in both BK via open valves BP1 and BP2. For extreme safety requirements, it is also possible for a redundant discharge valve ZAVr to be installed in the line to the reservoir VB.

Causes of failure in the master brake cylinder HZ and travel simulator WS are normally the seals. In the case of the master brake cylinder HZ, an additional seal D3 with a throttle may be used in the return line to the reservoir VB in order to be able to diagnose failure of a seal at an early stage. A leak can thus be identified by way of a small additional pedal movement by means of the pedal stroke sensors. The low loading in the case of HAD and FAD must be taken into account.

In many systems, for diagnosis of the seals, a normally open solenoid valve is connected into the return line, which solenoid valve is closed for the purposes of diagnosis. Here, pressure is conducted from the pressure supply device DV1 into the master brake cylinder HZ via the valves PD1, BP1 and EV. The diagnosis is performed by way of a variation of pressure with constant piston position or variation of the piston position with constant pressure. As an alternative, it is also possible here for a combination of throttle and check valve to be used in a cost-saving manner. The throttle is dimensioned such that a leakage flow through the seal leads only to a slight pedal displacement within a normal braking time of approximately 10 seconds.

The same solution is also used in the case of the WS piston with redundant seal, diagnosis as above in the case of D3 by way of the pedal movement. In addition, control of the brake force boosting remains possible even with these failed seals, but with a changed pedal characteristic. Here, too, there is an extremely low failure rate for the failure of two seals almost in the range $<10^{-10}$/year. The pressure supply device DV1 may also be equipped with redundant seals, as described above in the case of the master brake cylinder HZ, with D6 with throttle between D6 and D5. If the suction valve is connected directly to the connection to PD1, the aspiration starts immediately upon the return stroke of the piston, with the advantage that high suction power is realized even at low temperatures. A failure or leak of the SV causes failure of the DV in the limit case. A compromise is the connection of the SV at approximately 60% of the stroke. Thus, 40% of the stroke is possible without any effect of a leaking SV and at the same time an aspiration action in the normal temperature range is possible. With the small restriction mentioned above, the volume delivery of the piston is ensured by redundancy. Furthermore, the motor can be controlled by means of a redundant 2×3-phase winding, such that the DV can only fail owing to a blocking KGT.

The ABS function via multiplex operation MUX and the pressure supply device DV1 takes place as described in WO 2006/111393 A1. Extended MUX functions result from a central discharge valve ZAV. If, during the pressure build-up $p_{auf}$ in the brake circuit BK1, a pressure dissipation $p_{ab}$ in the other brake circuit BK2 is required at the same time, this is performed via the discharge valve central ZAV and simultaneously closed valve BP1. As a result, the multiplex system MUX is loaded only by two wheel brakes RB1, RB2 in the brake circuit BK1, that is to say a pressure build-up Pauf and a pressure dissipation Pab in the wheel brakes RB1 and RB2 of the brake circuit BK1 cannot occur simultaneously. Alternatively, it is also possible for a discharge valve AV1, AV2 in the respective brake circuit to be used for the pressure dissipation $p_{ab}$ in order to relieve the MUX of load. The discharge valve AV1, AV2 may be arranged or connected either between the switching valve SV and a connecting switching valve BP1, BP2 or else between the wheel brake and the associated switching valve SV, such that a direct pressure dissipation Pab can take place via the discharge valve to a reservoir VB. This is particularly expedient for the pressure dissipation Pab in the front wheels. In the case of this alternative, the central discharge valve ZAV is not required.

The ABS function by means of the second pressure supply device DV2 is slightly restricted in this case, in particular no Pauf in the case of Pab. Fully individual ABS control is nevertheless possible. The infrequent use of the pressure supply device DV2 at pressures greater than 120 bar and in the event of failure of the first pressure supply device DV1 must be taken into account.

Typical for the abovementioned MUX operation is the pressure control, even in the case of ABS, by way of the volume measurement and by way of the piston movement of the pressure supply device DV1, also taking into account the pressure-volume characteristic curve (p-V characteristic curve). In the case of a simple eccentric piston pump, this can be performed not by way of the piston movement but by way of the delivery time=volume with additional rotational speed measurement and possibly pressure measurement. A metering-in of volume for the pressure build-up is thus also possible. An advantage here is a serial and non-simultaneous pressure build-up $p_{auf}$ in the individual wheel brakes during the pressure build-up $p_{auf}$. Here, the valve dimensioning and the back pressure on the valve must be taken into account, in particular in the case of the valves BP1 and BP2, in the case of fast pressure build-up in the wheel circuits. The back pressure of the abovementioned valves acts as a pressure difference between the brake circuits BK1 and BK2. This can be reduced considerably if both pressure supply devices DV1 and DV2 are activated in this operating state. Here, a single-circuit gearwheel pump is also expedient instead of a piston pump. Here, the pressure dissipation $p_{ab}$ and pressure build-up $p_{auf}$ may also be performed by means of the gearwheel pump. For this purpose, instead of the check valve RV, a valve MV (not shown) is required in the return line to the reservoir VB. Full MUX operation is thus also possible with the second pressure supply device DV2.

The open-loop and closed-loop control device ECU is a constituent part of the overall system and of the packaging. A redundant or partially redundant ECU is required for a fail-safe function. This partially redundant ECU may also be used for particular functions in addition to the redundant ECU. In any case, the valves are or should be driven redundantly by means of separate valve drivers and circuit breakers, which deactivates a failed valve driver.

A redundant on-board electrical system connection is also required for the redundancy of the open-loop and closed-loop control unit ECU. A connection to 48V may also be used for the connection of the motors. An advantage of 48V is higher dynamics. In the event of failure of the motor of the pressure supply device DV1 in the case of 48V, emergency operation with 12V with approximately 50% power is realized, with reduced dynamics and a cost saving. For this purpose, the motor must be configured for example for 24V.

A pressure transducer DG is preferably used in the brake circuit BK2, possibly also in BK1. In the event of failure of the pressure transducer, closed-loop pressure control can be performed by means of the measurement of the current of the motors, and open-loop position control of the piston can be performed by means of the p-v characteristic curve.

Alternatively, the hydraulic connection may be made from the pressure supply device of the brake circuit BK2—as illustrated in FIG. 1b and denoted by X—to the inner connecting line VLa of the valves BP1 and BP2. In this alternative, the pressure supply device DV2 no longer acts directly in the brake circuit BK2. This has an advantage in the event of a failure of the valves BP2, SV and of the pressure supply device DV1. The failure of DV1 and DV2 can be avoided here by virtue of DV2 acting in brake circuit BK1 with BP2 and PD1 closed. However, triple faults with a minimum failure probability of approximately $<5\cdot10^{-18}$/year must be taken into account in comparison with the failure of the wheel circuit of $<5\cdot10^{-6}$/year, that is to say 5 faults in one million vehicles per year. This is opposed by various disadvantages; for example, in the event of failure of the valve FV (for example leakage), failure of the pressure supply in the brake circuit BK2 also occurs.

In the pressure line of a pressure supply device DV1, DV2, there may be arranged a pressure relief valve ÜV1, ÜV2 for protecting the drive, in particular the spindle and/or the ball-screw drive, which pressure relief valve opens for example at approximately 120 bar.

FIG. 3 shows the pressure supply devices DV1 and DV2 with a valve arrangement. Here, an electric brake pedal, a so-called electric pedal, with WS pedal travel sensors with a small sensor ECU and KWS without a hydraulically acting master brake cylinder HZ are combined in one unit. This has advantages if the installation volume in the engine compartment is small or the noise requirements are stringent. The signals of the pedal travel sensors are processed in a sensor ECU and fed to the central ECU. The "3 out of 2" evaluation is advantageously used in the electric pedal.

The abovementioned unit has the 2-circuit VB with float and level sensor NS, which may be integrated in the central open-loop and closed-loop control unit ECU. Said level sensor NS should likewise be of redundant design and measure the level continuously, because a loss of volume owing to leakage is detected quickly in this way. Since, here, there is no connection to the master brake cylinder HZ and thus also no fall-back level in relation to the main brake cylinder HZ in the event of failure of both pressure supply devices DV1 and DV2 and/or of the on-board electrical system, the valves BP1 and BP2 are preferably designed as normally open valves.

FIG. 4 shows a brake system according to FIG. 3, but without a mechanical actuation unit, that is to say without a brake pedal for an application for AD level 5. Additionally, a superordinate open-loop and closed-loop control unit Master ECU is provided, which is connected to the open-loop and closed-loop control unit Slave ECU of the brake system via redundant data lines DS1 and DS2.

FIG. 5 is a schematic illustration of a further possible embodiment of the inventive brake system with only one pressure supply in which, additionally, hydraulically assisted electromechanical brakes are arranged at the rear axle HA and an electric drive motor is provided at one or both axles. Such a brake system is more cost-effective than a brake system with two pressure supplies and is designed in particular electric city vehicles. If the hydraulically assisted electromechanical brakes H-EMB are designed accordingly, H-EMB replaces the conventional wheel brake modules RB3 and RB4 and, furthermore, a mechanical or electrical parking brake EPB is not required. The pressure in the hydraulically assisted brakes H-EMB is adjusted by the pressure supply device DV. In the brake system shown in FIG. 5, by way of example, one outlet valve AV is provided per brake circuit. The brake system is controlled primarily in multiplex operation, wherein the pressure build-up is performed by the piston control means of the pressure supply device/electric motor of the H-EMB and the pressure dissipation is performed by means of piston travel control of the pressure supply device and outlet valves AV. The pressure supply may be implemented redundantly, as illustrated in the following FIG. 6. Since there are redundancies in the braking force generation by way of (redundant) pressure supply, H-EMB and electric motor, a simple actuation unit with only one piston and a single-circuit fall-back level in the front axle is sufficient, in the case of electric vehicles or hybrid vehicles with a stable on-board electrical system, for a reliable fall-back level for city vehicles. With a corresponding redundancy configuration of the motors of H-EMB and pressure supply, the actuation unit BE can be omitted if the fail safety that can thereby be achieved satisfies the legal requirements for minimum braking action in the event of a fault.

FIG. 6 shows a possible embodiment of a pressure supply device DV1 with two open-loop and closed-loop devices DV-ECU1 and DV-ECU2, which can replace the pressure supply in FIG. 5 for greater fail safety. The pressure supply device has an electric motor M1, the rotor R of which adjusts a spindle SP which is connected to a piston KB. By means of the adjustment of the piston KB, a pressure can be built up in the pressure chamber DR, which pressure can be conducted into a brake circuit BK via the isolating valve TV. The piston is sealed by means of several seals in the cylinder, wherein a redundant, diagnosable seal system is created as in the actuation unit BE. In the pressure supply device, too, in each case one hydraulic line to the reservoir leads between the seals. This means that the pressure supply remains fully operational and redundant even in the event of failure of a seal. The pressure chamber DR is connected to the reservoir by means of a check valve. The pressure supply can thus impart a replenishing delivery action. Each of the two open-loop and closed-loop control devices DV-ECU1 and DV-ECU2 is connected via 1×3 phase lines to respectively separate winding or phase systems of the motor M1, such that, in the event of failure of one open-loop and closed-loop control device or of one winding system, the motor M1 can continue to be operated by means of the other winding or phase system and the other open-loop and closed-loop control device, although then only approximately half of the torque can be generated by means of the drive M1. One or both open-loop and closed-loop control device(s) has or have sensors for ascertaining the temperature T, the motor current i and the rotor angle of the electric motor α. In order to achieve high availability, not only are the open-loop and closed-loop control devices DV-ECU of redundant design, but electrical supplies BN1, BN2 and data and control lines DS1 and DS2 are also provided twofold. The electrical supplies BN1 and BN2 may for example be different voltage levels of an on-board electrical system or separate on-board electrical systems. As an alternative to 2×3 phase control, the motor may be configured with 1×3 phases and have a B8 bridge.

FIG. 7a shows torque diagrams to illustrate the braking force assistance by means of a hydraulically assisted electromechanical brake H-EMB and traction motor TM. The left-hand diagram shows the torque profile $M_{hyd, DV1}$ that can be attained by means of the pressure supply device DV1 alone. The right-hand diagram shows the torque profile that can be attained by adding the hydraulically assisted electromechanical brake H-EMB and a traction motor TM. A maximum torque $M_{max, H-EMB}$ of H-EMB and $M_{max, TM}$ of the traction motor is available. Owing to the braking torque $M_{max,TM}$ additionally generated by the traction motor TM and the braking torque $\Delta M_{H-EMB}$ generated by means of the H-EMB, the locking pressure (horizontal dashed line) is reached earlier by the time period $\Delta t$. A significantly higher braking torque can also be generated.

FIG. 7b shows the possibility of downsizing the pressure supply device DV1, if the braking action of the hydraulically assisted brake (H-EMB) according to FIG. 4a is incorporated in the pressure control. The pressure supply device DV1 should thus be reduced not with regard to the maximum pressure that it can build up but rather with regard to its dynamics, whereby the electric motor can be produced at lower cost.

FIG. 7c shows torque diagrams to illustrate the braking force assistance by means of hydraulically assisted electromechanical brake H-EMB and traction motor TM in emergency operation in the event of failure of one winding or phase system 1×3 phases of the drive M1. As a result of the elimination of one winding system, the pressure supply DV1 can no longer build up the necessary pressure build-up up to the locking pressure, and is also no longer sufficiently dynamic. Through the use of the hydraulically assisted electromechanical brake H-EMB and of the traction motor(s), the required dynamics and the required brake pressure can be built up (right-hand diagram).

LIST OF REFERENCE DESIGNATIONS

1 Hydraulic line
2 Hydraulic line

3 Hydraulic line
4 Hydraulic line of the first brake circuit BK1
5 Hydraulic line of the second brake circuit BK2
6 Hydraulic line
8 Motor
15 Self-locking gear mechanism
16 Spindle with pinion
16a Pinion
16b Axial projection of the spindle
17 Worm wheel
8 Axial guide
19 Adjustment piston
20 Brake piston
21 Brake lining
22 Disk brake
23 Brake caliper
24 Spindle nut
24a Axial fixing of the spindle nut 24
25 Axial bearing
26 PCB of the ECU
27 Motor sensor
27a Electrical connection to the motor sensor 27
28 Position sensor
28a Target of the position sensor 28
29 Pressure piston of the pressure supply DV
30 Non-self-locking spur gear mechanism
31 Planetary gear mechanism
32 Motor output shaft
33 Blocking wheel
34 Blocking slide
35 Magnet system 1 with coil
35a Magnet system 2 with coil
35b Electrical connection to the PCB
36 Magnetic clamp
37 Pole plate to the blocking slide
38 Resetting spring
39 Bearing arrangement
40 Parking lock
48 Electric motor
48a Electrical connection to the PCB
$AV_i$ Outlet valve
ZAV Central outlet valve
BP1, BP2 Isolating valves between the brake circuits
H-EMB,
H-EMB1,
H-EMB2 Hydraulically-electromechanically actuatable brake
P Pedal plunger
BK1, BK2 Brake circuits
DV Pressure supply device
D1-D13 Seals
D20-21 Seals on the adjustment piston
KWS Force-travel sensor
ECU Electronic open-loop and closed-loop control unit
Central ECU Central control unit
M-ECU Master ECU
S-ECU Slave ECU brake system
Sensor ECU ECU for sensor evaluation
SV Switching valve
$SV_H$ Switching valve for one or more H-EMB
FV Isolating valve
RV Check valve
AS Shut-off valve
SVH Shut-off valve, H-EMB
SV Switching valve, brake system
DG Pressure transducer
Dr Throttle
Drs Throttle for redundant seal
VB Reservoir
WS Travel simulator
SK Floating piston
LHA Line to the rear axle
KGT Ball-screw drive
KF Piston resetting spring
$RB_i$ Wheel brakes
VLa Hydraulic connecting line between BP1 and BP2

The invention claimed is:

1. A brake system for a motor vehicle, including:
at least one electromotive pressure supply device for hydraulic adjustment of a brake piston of at least one wheel brake, and
at least one hydraulic-electromechanical wheel brake for electrical adjustment of the brake piston of the wheel brake,
wherein an electric motor and a first gear mechanism are provided for electromechanical actuation of the wheel brake, wherein the first gear mechanism transmits drive force of the electric motor to a second gear mechanism,
wherein the hydraulically-electromechanically actuatable wheel brake has a hydraulic adjustment device with a piston-cylinder unit, an adjustment piston of which is configured for adjustment of the brake piston and/or the exertion of a force on the brake piston, wherein the adjustment piston is adjustable, or a force is exertable on the adjustment piston, by means of the at least one electromotive pressure supply device.

2. The brake system as claimed in claim 1, wherein one of the at least one pressure supply device acts on wheel brakes of a front axle of the motor vehicle, and/or on at least one hydraulic-electromechanical brake of a rear axle of the motor vehicle.

3. The brake system as claimed in claim 1 wherein the at least one hydraulically-electromechanically actuatable wheel brake serves for braking of a rear wheel of the motor vehicle and/or a parking brake function of the vehicle.

4. The brake system as claimed in claim 1, wherein the brake piston is electrically and/or hydraulically adjustable by means of the electric motor and/or by means of the at least one electromotive pressure supply device and the adjustment piston to achieve full service braking action and immobilizing braking action.

5. The brake system as claimed in claim 1, wherein at least one electromotive pressure supply device comprises a hydraulic piston-cylinder unit driven by an electric motor via a gear mechanism or has a piston pump or gearwheel pump which is driven by an electric motor, and which has a continuous conveying action.

6. The brake system as claimed in claim 1, wherein only one electromotive pressure supply device is provided, which is implemented redundantly.

7. The brake system as claimed in claim 1, wherein two electromotive pressure supply devices are provided, wherein each one of the electromotive pressure supply devices is configured to supply pressure to a brake circuit and at least one of the electromotive pressure supply devices is configured for the hydraulic-electromechanical brake, and wherein, in the event of a fault of one of the two electromotive pressure supply devices, the remaining electromotive pressure supply device is configured to supply pressure via a connecting valve circuit to the brake circuit and to the hydraulic-electromechanical brake associated with the electromotive pressure supply device that has the fault.

8. The brake system as claimed in claim 1, wherein the electromechanically actuatable wheel brake comprises a device to prevent complete blocking of the adjustment of the brake piston and/or to ensure braking action for an increase or reduction of braking torque.

9. The brake system as claimed in claim 1, wherein the adjustment piston acts on the second gear mechanism to transmit a displacement of the hydraulic adjustment device or of the hydraulic adjustment piston to the brake piston of the wheel brake.

10. The brake system as claimed in claim 1, wherein the first gear mechanism is of self-locking design, wherein the second gear mechanism comprises a ball-screw drive, and wherein the first gear mechanism acts on the brake piston via a non-rotatable spindle and spindle nut of the ball-screw drive.

11. The brake system as claimed in claim 1, wherein the second gear mechanism comprises a ball-screw drive having a spindle and a spindle nut, and wherein the adjustment piston acts axially on the brake piston, without rotation of the spindle of the ball-screw drive, and is arranged so as to be axially displaceable, by means of a pinion, relative to a gearwheel of the first gear mechanism.

12. The brake system as claimed in claim 11, wherein the adjustment piston has a passage through which an axial projection of the spindle of the ball-screw drive extends, on which axial projection there is arranged a pinion which is mounted axially displaceably in the gearwheel.

13. The brake system as claimed in claim 1, further including a hydraulic subsystem, wherein the hydraulic subsystem comprises:
a pedal-actuated master cylinder with a piston and with a working chamber, and
a travel sensor,
with redundant seals for the master cylinder and the travel sensor, and with redundant isolating valves in a hydraulic line to the at least one electromotive pressure supply.

14. The brake system as claimed in claim 1, wherein the electric motors for the at least one electromotive pressure supply device and/or the electrical adjustment means of the hydraulically-electromechanically actuatable wheel brake have redundant motor winding activation means.

15. The brake system as claimed in claim 1, wherein a hydraulic pressure control of one or more of the wheel brakes utilizes redundant electromagnetic switching valves which are actuated in both directions in the event of large pressure differences between an inlet of the at least one electromotive pressure supply and an outlet to a respective wheel brake cylinder.

16. The brake system as claimed in claim 1, wherein closed-loop pressure control for anti-lock braking is performed for two wheel brakes using valves, by means of multiplex operation.

17. The brake system as claimed in claim 1, further including:
an actuating device designed as an electric brake pedal or start/go switch, and
a redundant pressure supply device.

18. The brake system as claimed in claim 2, wherein, in the event of failure of hydraulic adjustment of the adjustment piston, adjustment of the wheel brakes of the rear axle is performed electrically.

19. The brake system as claimed in claim 1, wherein different switching modes are enabled for control of braking torque, wherein approximately 90% of the braking torque is built up by means of hydraulic adjustment, and wherein generation of a differential braking torque in the cases of anti-lock braking/electronic stability control and immobilizing brake action is performed by means of electrical adjustment and pressure dissipation via outlet valves.

20. The brake system as claimed in claim 1, wherein the hydraulic adjustment piston is enabled to assume a central position which is determined by means of a spring, wherein, in the event of a reduction of braking torque by means of electrical adjustment, the spring is, by closure of a valve, ineffective for the adjustment of the adjustment piston.

21. The brake system as claimed in claim 1, wherein, by means of the electric motor of a respective hydraulic-electromechanical brake of the at least one hydraulic-electromechanical brake and at least one of the electromotive pressure supply devices, pressure is built up simultaneously or partially simultaneously in respective ones of the hydraulic-electromechanical brakes with different pressure levels.

22. The brake system as claimed in claim 21, wherein, in the case of simultaneous pressure build-up, different pressure levels are built up at the same time by way of different assistance of the electric motors of the respective hydraulic-electromechanical brakes, and/or a particular pressure is built up in the respective hydraulic-electromechanical brake by means of pulse width modulation control of switching valves.

23. The brake system as claimed in claim 1, wherein, by means of the electric motor of the at least one hydraulic-electromechanical brake and at least one of the electromotive pressure supply devices, pressure is built up simultaneously and/or partially simultaneously in different wheel brakes and, at the same time, pressure is dissipated at other wheel brakes by opening of outlet valves.

24. The brake system as claimed in claim 1, wherein, by means of the motor of the at least one hydraulic-electromechanical brake, the brake piston is retracted to such an extent that a lining clearance is set, wherein the lining clearance is a particular predetermined lining clearance and/or is sufficiently large so as to minimize or avoid friction during non-activation of the at least one hydraulic-electromechanical brake.

* * * * *